Figure 5:
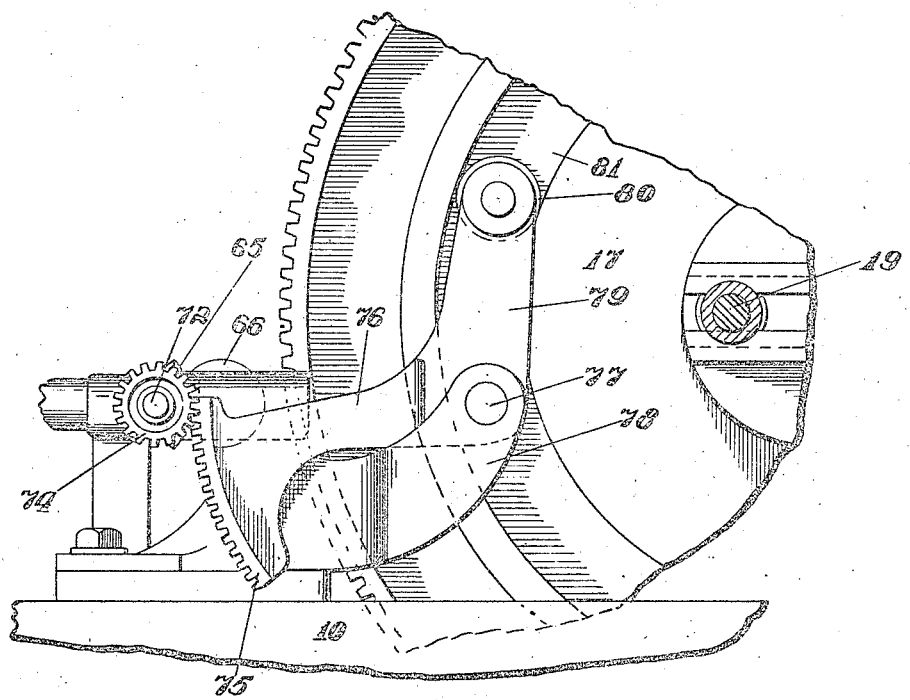

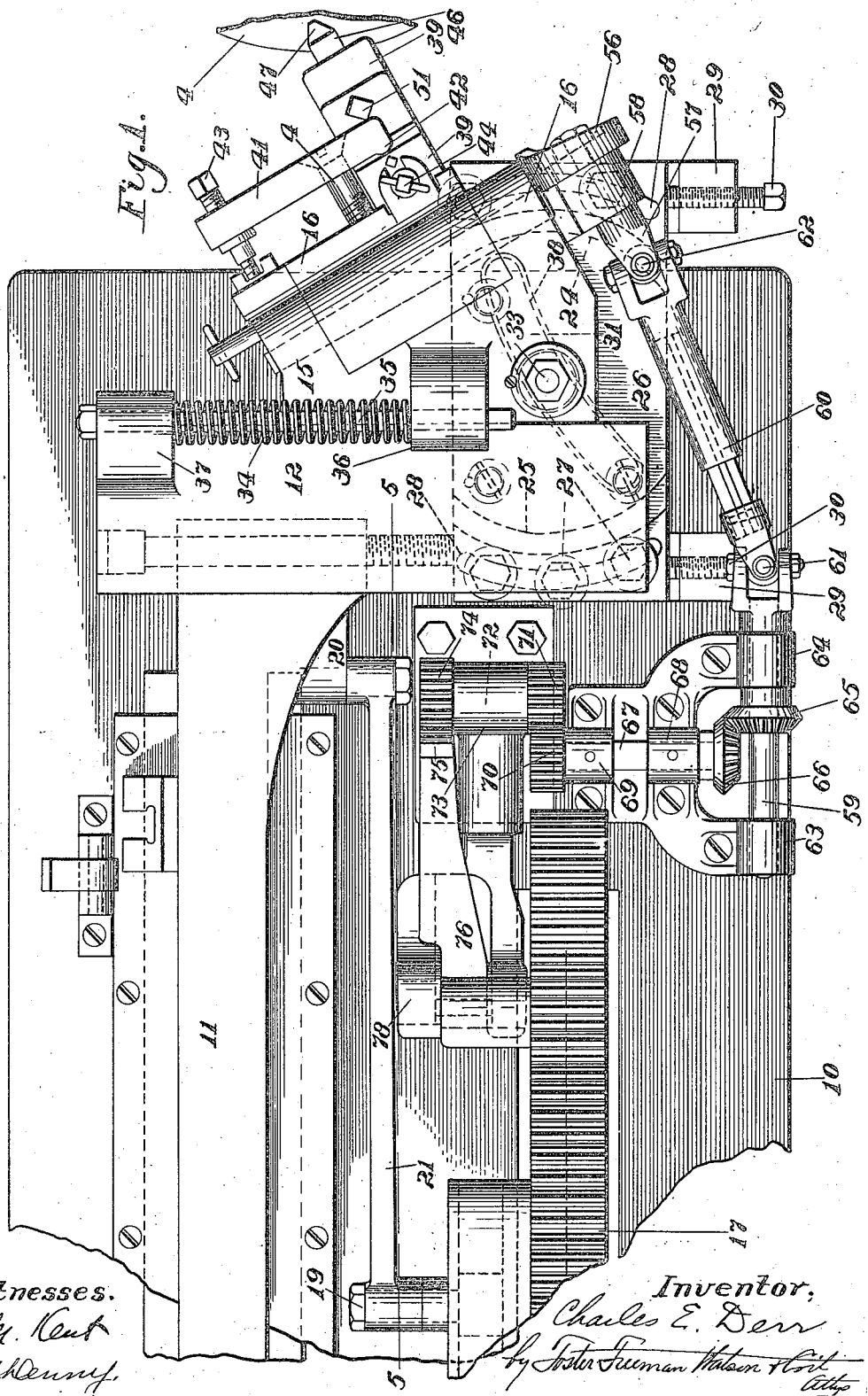

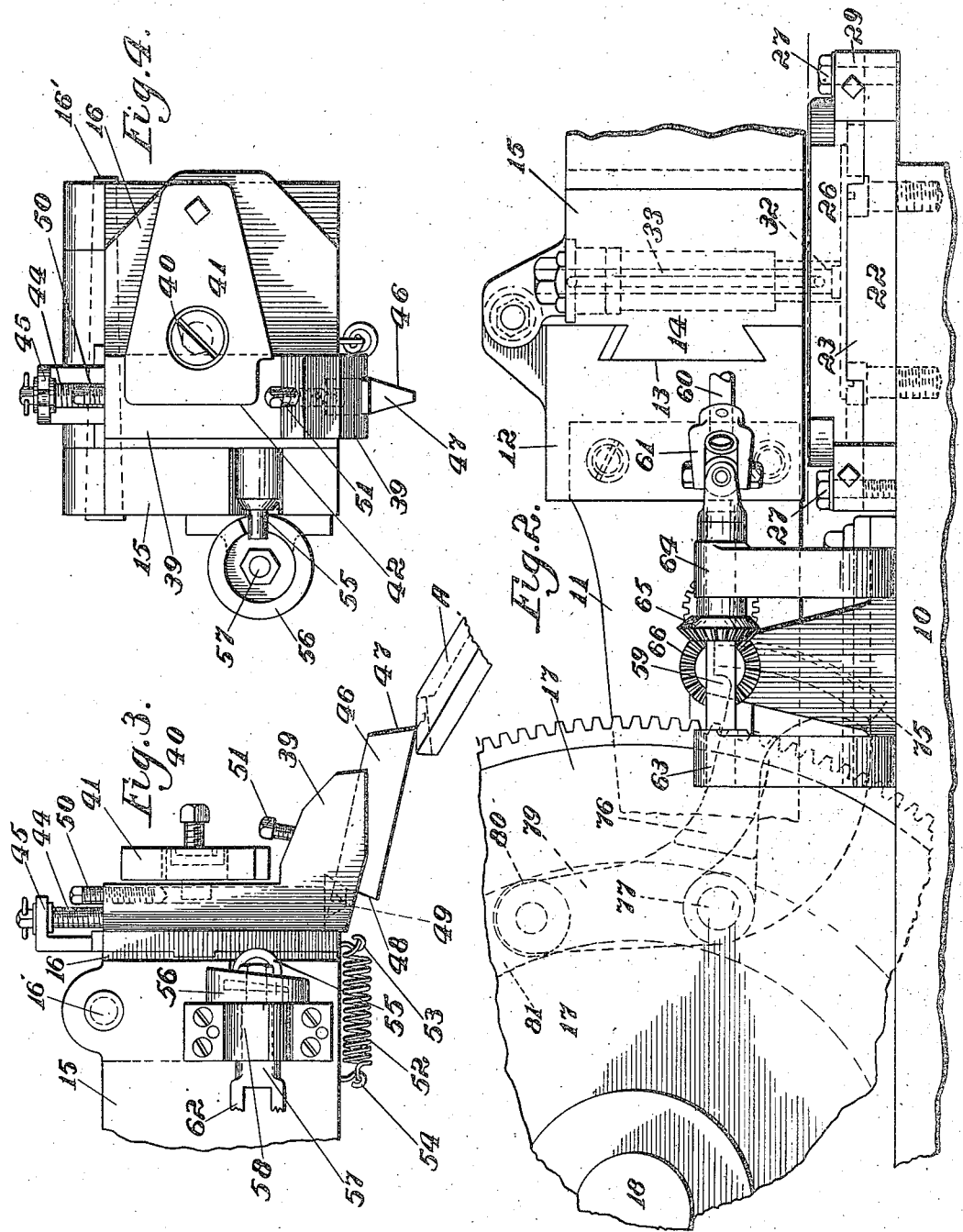

UNITED STATES PATENT OFFICE.

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

GEAR-CUTTING MACHINE.

1,170,425.   Specification of Letters Patent.   Patented Feb. 1, 1916.

Original application filed February 11, 1913, Serial No. 747,677. Divided and this application filed May 28, 1914. Serial No. 841,608.

*To all whom it may concern:*

Be it known that I, CHARLES E. DERR, a citizen of the United States, and resident of Detroit, Wayne county, State of Michigan, have invented certain new and useful Improvements in Gear-Cutting Machines, of which the following is a specification.

This application is a division of co-pending application Serial No. 747,677, filed February 11, 1913, and relates to gear cutting machines, particularly to certain improvements whereby bevel gears having curved or skewed teeth are adapted to be cut on such machines.

One of the objects of the invention is to provide a simple, rigid construction for efficiently operating the cutting tool.

Another object is to provide a construction which is not subject to excessive wear.

A further object is to provide a carriage having the tool carrying apron so pivoted in relation to the path of travel of the tool that the latter may be lifted from the blank without interference with the teeth which are being cut.

Another object is to provide improved means for lifting the tool carrying apron on the return stroke of the tool.

Other objects and the features of novelty will be apparent from the following description, taken in connection with the drawings, in which:

Figure 1 is a plan view of a portion of a gear cutting machine embodying my improvements; Fig. 2 is a side elevation of parts shown in Fig. 1; Fig. 3 is a side elevation of the tool holder and a portion of the tool carriage; Fig. 4 is a front elevation of the tool holder and carriage; and Fig. 5 is a detail section of a part of the tool lifter mechanism as shown substantially on the line 5—5 of Fig. 1.

In the embodiment of my invention shown, it will be seen on reference to the drawings, that 10 indicates the frame of the machine on which is slidably mounted the ram 11 having secured thereto the head 12. The head 12 is provided with a suitable dovetail slot 13 in its front face in which is arranged the dovetail 14 of the tool carriage 15. The carriage 15 has pivoted thereto the tool supporting apron 16, the pivot 16' being arranged at an angle to the direction of movement of the ram 11 (see Fig. 1) and substantially at right angles to the direction of movement of the tool.

As in the case of my prior application, Serial No. 725,328, filed October 11, 1912, upon which this invention is an improvement, this machine is especially adapted for cutting bevel gears having spiral or curved teeth and the curvature of the teeth is formed by combining with the usual reciprocating movement of the ram and tool carriage, a transverse movement of the carriage. The ram and the tool carriage may be reciprocated in any suitable manner and for this purpose I have provided a gear wheel 17 mounted on a shaft 18 and driven from any suitable source of power. The wheel 17 carries an adjustably arranged crank pin 19 which is connected with a pin 20 on the ram 11 by means of connecting rod 21. The location of the crank pin 19 relative to the axis of the shaft 18 is adjustable for the purpose of varying the stroke of the ram 11.

In order to move the tool carriage laterally a plate 22 may be secured to the frame 10 beneath the carriage and having a raised central portion 23 provided with the circular edges 24 and 25, this raised portion thus constituting a pivot for a plate 26 which is secured on the plate 22 by means of suitable bolts 27 passing through slots 28 in the plate 26. The plate 26 as thus arranged constitutes a form of turn table. In order to hold the plate 26 in any desired position, the plate 22 is provided with the lugs 29 through which pass the adjusting screws 30, these screws engaging one of the edges of the plate 26 so that by turning these screws in opposite directions it is possible to swing the plate 26 on the raised portion 23 of the plate 22. The plate 26 is provided with a suitably formed cam slot 31 in which moves the cam roller 32 carried by the pin or bolt 33 on the tool carriage 15.

It will be obvious that as the ram 11 is reciprocated the tool carriage will be moved laterally by the engagement of the roller 32 with the edges of the cam slot 31. In order to prevent back lash of the roller 32 in the slot 31 and maintain the roller in yieldable contact with one side of the slot I have provided a comparatively stiff spring 34 which is arranged on a bolt or pin 35 between the brackets 36 and 37. The bracket 36 is secured to the tool carriage 15 and the bracket 37 is secured to the head 12 of the ram 11. The bolt or pin 35 is preferably secured in the bracket 37 so that as the ram reciprocates, the spring 34 will be alternately contracted and extended and will maintain the roller 32 in yieldable contact with the side 38 of the cam slot 31.

The tool apron 16 has arranged on its front face the tool holder 39, this holder being held in position by means of a clamping plate 41, which is fulcrumed on the screw 40 and has its side 42 forced into engagement with the tool holder, to secure the latter, by means of a screw 43. The tool holder 39 may be adjusted vertically by means of a screw 44 which is held in a bracket 45 on the apron 16. The tool holder is provided with a dovetail slot in its lower side which receives the wedge shaped tool 46, the cutting edge 47 of which is arranged at the forward end of the tool. The rearward end 48 of the tool 46 is beveled and has arranged in engagement therewith a wedge 49 which may be adjusted vertically by means of a screw 50 for the purpose of moving the tool forwardly. The tool may be clamped in any desired position by means of a set screw 51. In order to yieldably retain the apron 16 in its operative position against the forward face of the tool carriage 15, I have provided on the under side of the carriage a spring 52, this spring being connected with suitable arms 53 and 54 on the apron and carriage, respectively.

In the operation of the machine the tool 46 makes a cut in the blank A on the forward stroke and in order to lift the tool out of the space between the teeth, on the return or rearward stroke, I provide on one side of the apron a pin or roller 55 which is adapted to be engaged by a cam 56 on a shaft 57. The shaft 57 is mounted in a suitable bearing 58 at the side of the carriage 15 and is connected with a shaft 59 by means of a telescopic shaft 60 and the universal joints 61 and 62. The shaft 59 is mounted in bearings 63, 64 on the frame 10 and carries a bevel gear 65 which meshes with a gear 66 on the shaft 67, the latter shaft being mounted in bearings 68 and 69, and also carrying a gear 70. The gear 70 meshes with a gear 71 on shaft 72, this shaft being mounted in a bearing 73 and also carrying a gear 74. The gear 74 meshes with a segmental gear 75 which is carried by one arm 76 of a bell-crank pivotally mounted at 77 on a suitable bracket 78. The other arm 79 of the bell-crank carries a cam roller 80 arranged in a cam slot 81 in the side of the gear 17, this cam slot being so formed as to rock the bell crank on the pivot 77.

As will be readily understood the rocking of the bell crank effects a rotation of the gear 74 and the cam 56, the arrangement of the parts being such that the cam 56 is given slightly less than a complete revolution by this rocking movement. The cam 56 is so formed that the apron 16 will be swung on its pivot 16' sufficiently to raise the tool 46 out of the tooth space in the blank A. The cam slot 81 is so formed in relation to the position of the crank 19 as to raise the tool 46 at the end of the forward stroke of the tool and maintain the tool in elevated position until it reaches approximately the end of the rearward stroke, when the tool will be permitted to fall to its operative or cutting position. It will be observed that the shaft 57 is on the tool carriage and the telescopic shaft 60 and the universal joints 61 and 62 provide for the movement of this shaft relative to the fixed shaft 59.

It is believed that the operation of the machine will be thoroughly understood from the foregoing description taken in connection with the drawings. It will also be understood that various changes may be made in the details of construction of the parts of the machine within the scope of my invention, as defined in the claims, and therefore I do not wish to be limited to the exact details of construction shown and described.

Having thus described my invention, what I claim and desire to secure by Letters Patent is:—

1. In a gear cutting machine, the combination of a frame, a ram slidably mounted thereon, a tool carriage movably mounted on said ram, and means comprising a telescopic operating shaft connected to said carriage.

2. In a gear cutting machine, the combination of a frame, a ram slidably mounted thereon, a tool carriage slidably mounted on the ram, a tool holding apron pivoted to the carriage, and means comprising a flexible operating shaft connected to said carriage for swinging said apron on its pivot.

3. In a gear cutting machine, the combination of a frame, a ram slidably mounted thereon, a tool carriage slidably mounted on the ram, a tool holding apron pivoted to the carriage, a rotary cam for swinging said apron on its pivot, an operating shaft for said cam mounted on said frame, and a flexible telescopic connection between said operating shaft and said cam for rotating the latter.

4. In a gear cutting machine, the combination of a ram, a tool carriage slidably mounted on the ram, a tool holding apron pivoted to the carriage, a rotatable cam on said carriage adapted to swing said apron on its pivot, and means for rotating said cam.

5. In a gear cutting machine, the combination of a frame, a ram slidably mounted thereon, a tool carriage slidably mounted on the ram, a tool holding apron pivoted to the carriage, a rotary cam for swinging said apron on its pivot, an operating shaft for said cam mounted on said frame, and a flexible shaft connecting said operating shaft and said cam for rotating the latter.

6. In a gear cutting machine, the combination of a frame, a ram slidably mounted thereon, a tool carriage slidably mounted on the ram, a tool holding apron pivoted to said carriage, a rotary cam for swinging said apron on its pivot, an operating shaft mounted on said frame, a flexible shaft connecting said operating shaft and said cam, means including a segmental gear for actuating said operating shaft, and cam means for rocking said segmental gear.

In testimony whereof I affix my signature in presence of two witnesses.

CHARLES E. DERR.

Witnesses:
 CLAIR J. COTE,
 LE ROI P. WILLIAMS.